No. 792,314.  
Patented June 13, 1905.

UNITED STATES PATENT OFFICE.

WILLIAM B. CHISOLM, OF CHARLESTON, SOUTH CAROLINA.

FERTILIZER AND PROCESS OF MAKING SAME.

SPECIFICATION forming part of Letters Patent No. 792,314, dated June 13, 1905.

Application filed October 17, 1904. Serial No. 228,875.

*To all whom it may concern:*

Be it known that I, WILLIAM B. CHISOLM, a citizen of the United States, residing in the city and county of Charleston, State of South Carolina, have invented certain new and useful Improvements in the Manufacture of Fertilizers; and I do hereby declare the following to be a full, clear, and exact description of the invention, such as will enable others skilled in the art to which it appertains to make and use the same.

In applications for Letters Patent of the United States filed by me under date of September 19, 1904, I have described the production of a combined fertilizer and germicide having as its ingredients an intimate mixture of fossil or bone phosphate, sulfur, and an ingredient supplying nitrogen or an alkali, or both. The basis of the final product in the applications referred to is phosphate and sulfur in the form of a substantially impalpable powder. The advantages of the combined fertilizer and the functions of its several ingredients are fully set forth in one of said applications.

My present invention relates to the production of a combined fertilizer and germicide having similar uses and properties. It depends upon the discovery that the necessary conditions for suitably admixing ordinary lump sulfur (seconds) with fossil or bone phosphate can be realized by grinding the phosphate to a substantially impalpable powder and mixing it with sulfur in a liquid condition. In order to obtain the liquid condition of the sulfur desirable in the practice of the invention, I prefer to boil it with water in the presence of lime or its equivalent.

In carrying out my invention I take five (5) parts, by weight, of sulfur to one (1) part, by weight, of unslaked lime and subject them to heat, with water, in a suitable kettle until the resultant product has reached an entirely liquid and homogeneous condition. In this condition I find the liquid to be adapted for intimate admixture with fossil or bone phosphate in a finely-ground condition, substantially in the form of an impalpable powder—as, for instance, the "floats" of the phosphate-mill—or phosphate-rock, which I grind to substantially this same degree of fineness—say, for instance, to a fineness sufficient to pass through the meshes of a sieve having one thousand (1,000) apertures to the square inch of sieve-surface. I preferably obtain the desired admixing of the liquid with the phosphate by pouring the liquid into the Lucop or other grinding-mill employed, where, together with the phosphate, it is subjected to the mixing action of the grinder-balls or their equivalents until the entire mass attains a homogeneous condition. In other instances, however, I may obtain a mixture suitable for my purpose by stirring the phosphate and the liquid together in any suitable mixing-machine other than the grinding-mill. Chemically considered, the combination produced by boiling the lime and sulfur together to form the liquid, as hereinbefore described, is calcium sulfid.

The relative proportions of ground phosphate and liquid employed by me in compounding this product are, say, one hundred and twenty-five (125) pounds of the liquid to one thousand eight hundred and seventy-five (1,875) pounds of ground phosphate-rock, or, say, one hundred and fifty (150) pounds of the liquid to one thousand eight hundred and fifty (1,850) pounds of the ground phosphate rock. This product may be made the subject of individual manufacture and sale, or it may be compounded with an ingredient furnishing nitrogen (in the form of ammonia or otherwise) or an alkali, or both. The proportions in which the said products are to be associated with the nitrogen or alkali supplying ingredients, or both, depend upon the quality of the soil and the character of the crop contemplated by the agriculturist. In one of my applications, above referred to, I have given suitable proportions for the admixture with the ground phosphate and sulfur therein proposed of the ingredients useful in the cultivation, for instance, of potatoes, wheat, and cotton, and I may say that the same proportions may be used in compounding a fertilizer from said nitrogen and alkali supplying ingredients with the mixture of calcium sulfid and ground phosphate described herein. In fact, to state it more broadly, the mixture of liquid and ground phosphate herein described is designed by me to play the same role in the compounding of the final fertilizer as does the mixture of sulfur and ground phosphate described in my aforesaid applications, and it is therefore to be used in practice under the same conditions as therein specified.

Having thus described my invention, what I claim is—

1. The method of producing a fertilizer, which consists in boiling sulfur and lime together to produce a homogeneous liquid, and mixing therewith finely-ground phosphate; substantially as described.

2. The method of producing a fertilizer, which consists in boiling sulfur and lime together to produce a homogeneous liquid, mixing therewith finely-ground phosphate, and grinding the liquid and phosphate together; substantially as described.

3. A fertilizer, having as a constituent an intimate admixture of liquefied calcium sulfid and ground phosphate.

In testimony whereof I affix my signature in presence of two witnesses.

WILLIAM B. CHISOLM.

Witnesses:
J. D. MULLER,
L. W. WHITING.